United States Patent Office 3,414,580
Patented Dec. 3, 1968

3,414,580
METHOD FOR THE PRODUCTION OF
SUBSTITUTED 5-AMINOPYRAZOLES
Hans Höhn, Regensburg, Germany, assignor to Chemische
Fabrik von Heyden A.G., Munich, Germany, a corporation of Germany
No Drawing. Filed July 2, 1964, Ser. No. 380,027
Claims priority, application Germany, July 24, 1963,
C 30,526
7 Claims. (Cl. 260—310)

ABSTRACT OF THE DISCLOSURE

A process for producing substituted 5-aminopyrazoles suitable for use as dyestuff components, sensitizer and medicaments wherein the 5-aminopyrazole has a formula

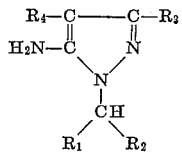

and which involves the cyclization of a compound selected from the group consisting of aldehyde and ketone hydrazone derivatives of β-cyano-alkyl hydrazines and having substantially the structural formula

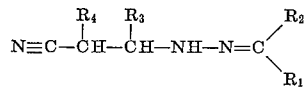

wherein $R_1$ is a hydrogen, an alkyl group of 1 to 5 carbon atoms, cyclopentyl, cyclohexyl, phenyl, benzyl, phenylethyl, isopropylphenyl, diphenylmethyl, furfuryl, pyridine, thiophene, dimethylaniline, methoxyethyl, methoxyphenyl, chlorophenyl,

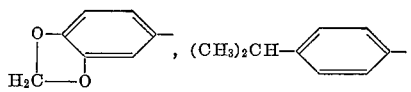

or

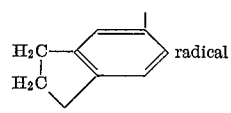 radical.

$R_2$ is a hydrogen, methyl, ethyl or phenyl radical or $R_1$ and $R_2$ is

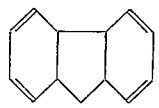

forming a common ring between $R_1$ and $R_2$, or

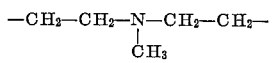

forming a common ring between $R_1$ and $R_2$; and $R_3$ is a hydrogen, methyl, ethyl, propyl, phenyl, furyl or thenyl radical, and $R_4$ is a hydrogen, methyl, thenyl or phenyl radical.

The present invention relates to a novel process for the production of substituted 5-aminopyrazoles and the 5-aminopyrazoles substituted in the 1 position and, if desired, also in the 3 and/or 4 positions, which are obtainable by this process; these compounds are useful, for example, as dyestuff components, sensitizers, medicaments and as intermediates in the synthesis of other chemical compounds.

The principal object of the invention is, therefore, the provision of a process for producing 5-aminopyrazoles substituted in the 1 position and, if desired, also in the 3 and/or 4 positions, which is simple, generally applicable, reliably reproducible, applicable on an industrial scale and, finally, based on inexpensive and readily available raw materials.

Hitherto known processes for the production of 5-aminopyrazole derivatives are based on the reactions of:

(a) β-Ketonitriles with monosubstituted hydrazines (cf. "Journal für Praktische Chemie" [2], 79, 16 (1909) and German Patent 1,133,384);

(b) Allene cyanide with monosubstituted hydrazines (cf. German Patent 1,093,369); and (c) Acrylonitrile with phenylhydrazine via an oxidized open-ring intermediate product (cf. German Patent 1,065,850).

A common feature of all the abovementioned methods of production is that they require as the starting compound monosubstituted hydrazines which, as is well known, have a strong tendency to decompose.

It has now been found that the said substituted 5-aminopyrazoles can be produced in a simple manner, without having first to obtain monosubstituted hydrazines by complicated methods, by the ring closure (via heating in a liquid solvent in the presence of a particular catalyst) of an aldehyde or ketone hydrazone derived from a β-cyanoalkyl hydrazine of Formula I:

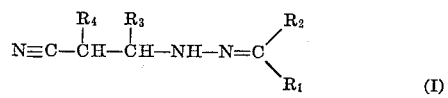 (I)

in which $R_1$, $R_2$, $R_3$ and $R_4$ are like or different radicals selected from the group which consists of hydrogen, aryl, alkyl, aralkyl, cycloalkyl or heteroyl radicals, and an alkyl radical interrupted by a heteroatom and in which $R_1$, $R_2$ and $R_3$, $R_4$, respectively, may in each case together be constituents of a common ring. The fact that this process can be carried out is surprising as hydrazones cannot in themselves by cyclized readily in the hydrazone form present on their formation according to Formula I.

A conversion of hydrazones of Formula I into 5-aminopyrazoles of Formula II:

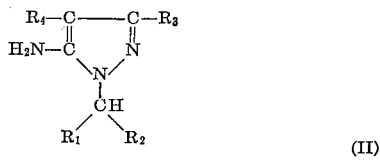 (II)

in which $R_1$, $R_2$, $R_3$ and $R_4$ have the significance stated above, is probably preceded by isomerization of the hydrazone molecule, this step being promoted by catalysts. It has been found that an isomerizing ring closure can be effected in a single step and in the same reaction medium by introducing simultaneously therein an isomerization and a cyclization catalyst.

It has also been found that there are catalysts that effect both isomerization and ring closure in one reaction process. Their use has proved particularly advantageous. Alcoholates and, particularly, butylates have proved successful as such ring closure and isomerization catalysts. According to present knowledge, the reaction may be assumed to proceed as follows:

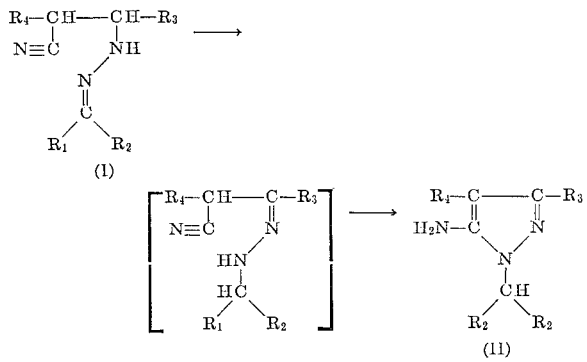

where $R_1$, $R_2$, $R_3$ and $R_4$ have the meanings given above.

The aldazones or ketazones of β-cyano-alkyl hydrazine required for the pyrazole-ring closure can be produced in a manner and with a very good yield either by reacting an aldehyde or ketone with a substituted β-cyano-alkyl hydrazine of Formula III:

(III)
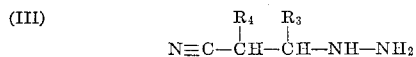

or they are obtained by reacting the three reactants:
(1) Hydrazine or hydrazine hydrate,
(2) aldehyde or ketone, and an
(3) α,β-unsaturated alkenic acid nitrile of Formula IV:

(IV)

or a β,γ-unsaturated alkenic acid nitrile of Formula V:

(V)
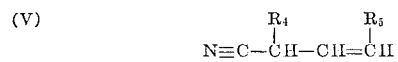

In Formulae III, IV and V, $R_3$ and $R_4$ have the meanings given for these radicals in Formula I and $R_5$ corresponds to the enumerated group with the addition of a methylene group to the meaning stated for Formula I for $R_3$ with hydrogen excepted. It is uncertain whether in the use of β,γ-unsaturated alkenic acid nitrile as starting material the hydrazine is added immediately to the β-carbon atom or a transposition of the double linkage with the formation of the corresponding α,β-unsaturated derivative takes place under the influence of the basically acting hydrazine or its hydrate.

The hydrazones obtained according to the method described are liquids or crystalline substances. These hydrazones can be purified by the usual methods, for example by vacuum distillation. It is not, however, necessary for the isomerizing ring closure to isolate these intermediate compounds since they may be converted directly into the corresponding pyrazoles by the addition of the catalyst, preferably while a reaction temperature within the range of about 90° C. to 130° C. is maintained.

The advantage of the new process as compared with known methods for the production of 5-aminopyrazole derivatives is not only that it is independent of the production, hitherto regarded as necessary, of monosubstituted hydrazines, which are unsuitable as intermediates of the products that can be manufactured according to the invention because of their readiness of decomposing and their, in part, expensive method of preparation which would impair decisively the economy of their manufacture. The advantage lies, moreover, particularly in the surprisingly high yields obtainable by the process of the invention, such yields being generally between 80 and 90% of the theoretical yields. Although the process is extremely simple and can be carried out with very great economy of operations, time and reaction space, it has proved to be generally applicable and to be reproducible with an unexpectedly high degree of reliability. It is obvious that the process of the invention dispenses with the redox technique and uses starting materials which are readily available and inexpensive; these advantages, which enhance the economy of the process, are, however, not gained by narrowly restricting the number of the products that can be realized thereby but, on the contrary, it is this selection of starting materials that is also the reason for its wide applicability. There also can be formed numerous compounds which could be obtained by known methods only with unsatisfactory yields or none at all, such as 5-aminopyrazoles aliphatically substituted only in the 1 position.

The process of the invention is illustrated in detail in the following examples:

EXAMPLE I 136 g. of benzaldehyde - β - cyanopropyl hydrazone was added to a solution of sodium butylate, prepared by dissolving 16.8 g. of sodium in 400 milliliters of n-butanol, and the whole was then heated for 5 hours with stirring and refluxing. After the reaction solution had cooled the 1-benzyl - 4-methyl - 5-aminopyrazole crystallized. It was filtered off by suction, washed with butanol and water and dried at 70 C. Melting point: 127–128° C. Yield: 128 g.=94% of theoretical. A snow-white product melting at 129–130° C. was obtained by recrystallization from benzene.

The benzaldehyde-β-cyano-β-methylethyl hydrazone required for the formation of the 1-benzyl-4-methyl-5-aminopyrazole was obtained by adding 89 g. of benzaldehyde drop by drop while stirring to a mixture of 79.3 g. of β-cyano-β-methylethyl hydrazine (prepared from α-methyl acrylic acid nitrile and hydrazine hydrate) and 140 milliliters of absolute alcohol in such a manner that the reaction temperature did not exceed 35 to 40° C. The mass was then stirred for two hours, the alcohol evaporated under reduced pressure and the resulting substance distilled under vacuum. Boiling point: 13° C.$^{0.2\text{ mm. Hg}}$ Yield: 136 g.=91% of theoretical.

EXAMPLE II 39.3 g. of cyclohexanone was added drop by drop to a mixture of 34 g. of β-cyano-ethyl hydrazine and 140 milliliters of absolute alcohol. After the mixture had been stirred for one hour while the temperature dropped, the alcohol was evaporated under reduced pressure, the crude cyclohexanone-β-cyano-ethyl hydrazone (boiling point: 103° C.$^{0.45\text{ mm. Hg}}$) being then introduced in a solution of 18.4 g. of sodium in 400 milliliters of n-butanol and the mixture gently boiled for 4 hours with refluxing. After the mixture had cooled, 47.5 g. of ammonium chloride, dissolved in 200 milliliters of water, was added thereto, the mixture stirred vigorously and the aqueous layer discarded after separation. The washing operation was repeated with 100 milliliters of water. The butanol solution was then evaporated under reduced pressure and the oily 1-cyclohexyl-5-aminopyrazole distilled under vacuum. Boiling point: 115–120° C.$^{0.5\text{ mm. Hg}}$. Yield: 61.7%=93% of theoretical.

EXAMPLE III 55.5 g. of acrylonitrile was added drop by drop, with stirring and cooling with a mixture of ice and sodium chloride, to a mixture of 62.5 g. of hydrazine hydrate of 80% strength and 50 milliliters of methanol. The rate of the drop-by-drop addition was adjusted so that the reaction temperature was between 0 and 5° C. After all the acrylonitrile had been added, the cooling bath was removed, the mixture stirred for ten minutes and then 106 g. of freshly distilled benzaldehyde added drop by drop in such a manner that the reaction temperature did not exceed 40° C. The dropping time could be shortened by cooling occasionally with tap water. The mixture was then stirred for 15 minutes and the top layer of the resulting two-phase system was syphoned off. The rest of the mixture of water and methanol was evaporated in a water-jet vacuum. A solution of 1.15 g. of sodium in 400 milliliters of anhydrous n-butanol was then added to the remaining oily benzaldehyde-$\beta$-cyano-ethyl hydrazone and the mixture heated for two hours while boiling slowly with refluxing, a gentle current of nitrogen being led through the apparatus. The butanol was then evaporated at a pressure of about 10 mm. Hg and a bath temperature rising to 95° C. The oily 1-benzyl-5-aminopyrazole remaining, which rapidly set to a very hard state on cooling, was poured while stirring before it crystallized into a mixture of 1200 milliliters of water and 90 milliliters of concentrated hydrochloric acid. A greasy by-product was then obtained (about 10–15 g. moist) which adhered to the walls of the vessel for the most part and was decanted off. 30 g. of Carboraffin was then added to the acid solution, the mass stirred for 15 minutes and then filtered. The slightly colored filtrate was left to stand overnight to allow a by-product (about 1 g.) to crystallize out. The solution was then filtered again and enough sodium hydroxide solution of 20% strength added to it while it was being stirred and cooled with tap water for it to evidence a distinctly alkaline reaction. The 1-benzyl-5-aminopyrazole was at first obtained in an oily form but it became very rapidly crystalline. It was suction-filtered after about two hours, washed with 100 milliliters of cold water and dried at 40° C. to 45° C. The well-dried, slightly yellowish product melted at 73–75° C. Yield: 129 g.=75% of theoretical. By saturating the alkaline filtrate with about 450 g. of sodium chloride, another 12 g. (7% of the theoretical yield) of 1-benzyl-5-aminopyrazole was obtained so that the total yield, related to hydrazine hydrate, amounted to 82%. A sample of the product, recrystallized from benzene, melted at 80–81° C.

EXAMPLE IV 106 g. of benzaldehyde was added drop by drop to a solution of 62.5 g. of hydrazine hydrate of 80% strength in 320 milliliters of anhydrous alcohol and the mixture was then heated for half an hour with refluxing. After it had cooled, 58 g. of acrylonitrile was added and the reflux temperature then maintained for 12 hours. Next, the alcohol was evaporated in a water-jet vacuum and the oily residue distilled under a pressure of 0.3 mm. Hg, benzaldehyde-$\beta$-cyano-ethyl hydrazone passing over at 143–146° C. Yield: 154 g.=89% of theoretical.

The benzaldehyde-$\beta$-cyano-ethyl hydrazone was cyclized as in Example II or III. The 1-benzyl-5-aminopyrazole, passing over at 133–135° C. under a pressure of 0.3 mm. Hg, crystallized in the receiver. Melting point: 79–80° C.

EXAMPLE V 34.3 g. of acetaldehyde in 100 milliliters of benzene was added drop by drop, while stirring, to a mixture of 64 g. of $\beta$-cyano-$\alpha$-methylethyl hydrazine, prepared from allyl cyanide and hydrazine hydrate, and 50 milliliters of benzene. The resulting temperature increase should not exceed 40 to 45° C. One hour after the completion of the reaction, the solvent was evaporated in a water-jet vacuum and the oily hydrazone then heated for five hours and refluxed with a solution of 1.5 g. of sodium in 240 milliliters of butanol. After the butanol had evaporated and the residue had been distilled, 71 g. (=87% of theoretical) of 1-ethyl-3-methyl-5-aminopyrazole was obtained. The pyrazole amine began to sublime at first at about 80° C. and a pressure of 0.4 mm. Hg and then to distill at 100–105° C. Melting point: 100–101° C.

EXAMPLE VI 85.1 g. of freshly distilled $\beta$-cyano-ethyl hydrazine was heated to 60° C. for one hour with 33 g. of thioxymethylene in 150 milliliters of anhydrous alcohol. Then, 100 milliliters of alcohol was evaporated in a water-jet vacuum and the liquid residue placed in a refrigerator to crystallize. After it had stood overnight, 30.5 g. of white formaldehyde-$\beta$-cyanoethyl hydrazone of the formula N≡C—CH$_2$—CH$_2$—NH—N=CH$_2$ was obtained as the first crystallizate. Another 54 g. of hydrazone was obtained by further concentration and cooling in the refrigerator or by distillation under vacuum (boiling point: 80° C.$^{1.5}$ $^{mm.}$ $^{Hg}$). Thus, the total yield amounted to 84.5 g.=85% of the theoretical. A sample, recrystallized from anhydrous alcohol, melted at 122–123° C. The product was very readily water-soluble. The formaldehyde-$\beta$-cyano-ethyl hydrazone was cyclized to 1-methyl-5-aminopyrazole in a manner similar to that of the preceding examples with sodium butylate. The melting point after recrystallization from benzene was 75–76° C.

EXAMPLE VII

From 26 g. of $\beta$-cyano-$\alpha$-phenylethyl hydrazine, prepared from cinnamic acid nitrile and hydrazine, in 25 milliliters of anhydrous alcohol there was obtained, with 21.2 g. of benzaldehyde, while boiling with refluxing for a short time, the corresponding hydrazone, which was isomerized and cyclized after the evaporation of the alcohol and the addition of 80 milliliters of a solution of sodium butylate containing 0.23 g. of sodium in solution. The reaction temperature was 120° C. and the reaction time was four hours. After the mixture had cooled and the butanol solution had been shaked with 27 milliliters of water containing 5.9 g. of ammonium chloride, the butanol was evaporated in a water-jet vacuum and the residue distilled under vacuum. Boiling point: 215–220° C.$^{0.6}$ $^{mm.}$ $^{Hg}$. The 1-benzyl-3-phenyl-5-aminopyrazole crystallized in the receiver. A sample, recrystallized from benzene, melted at 125–126° C. Yield: 40.8 g.=82% of theoretical.

EXAMPLE VIII 55.5 g. of acrylonitrile was added drop by drop, while stirring and cooling with a mixture of ice and sodium chloride, to 50 g. of hydrazine hydrate of 100% strength in 300 milliliters of butanol. The rate of the drop-by-drop addition was adjusted so that the reaction temperature was between −5° C. and +5° C. When all the acrylonitrile had been added the cooling bath was removed, the mixture stirred for 15 minutes and 86.1 g. of isovaleraldehyde added drop by drop in such a manner that the reaction temperature did not exceed 40° C. Then, 32 milliliters of the water liberated by the reaction was removed by means of a water separator. The residual water, which would disturb the ring-closure because of its solubility in butanol, was removed by distilling off 100 milliliters of butanol by means of the water separator with an open tap, whereby the temperature of the vapor in the flask rose from 100° C. to 118° C. A solution of 1.5 g. of potassium in 200 milliliters of anhydrous butanol was then added drop by drop to the hot reaction solution at such a rate that the boiling operation was not interrupted. The solution was then boiled for 5 hours with refluxing. After the reaction was complete, the butanol was evaporated at a pressure of 15 mm. Hg and the oily product distilled by means of an oil pump. Boiling point: 87–88° C.$^{0.15}$ $^{mm.}$ $^{Hg}$. The resulting 1-isopentyl-5-aminopyrazole crystallized in the receiver. A yield of 124 g.= 81% of the theoretical, relative to hydrazine hydrate, was obtained.

EXAMPLE IX 93 g. of 3,4-methylene dioxybenzaldehyde-β-cyanoethyl hydrazone, prepared from hydrazine hydrate, acrylonitrile and piperonal and melting at 78–79° C., was introduced in a solution of 1 g. of sodium in 170 milliliters of methyl glycol and heated for two hours with refluxing, the starting material going into solution. The methyl glycol was then evaporated off and the 1-(3′,4′-methylene dioxybenzyl)-5-aminopyrazole obtained as a reaction product was distilled by means of an oil pump. Boiling point: 168–171° C.$^{0.2}$ $^{mm.}$ $^{Hg}$. The product crystallized in the receiver. A sample, recrystallized from benzene, melted at a temperature of 82–83° C. Yield: 65.6 g.= 70% of theoretical.

If n-butanol was used instead of methyl glycol, a yield of the 5-aminopyrazole of 82–85% of theoretical with a melting point of 82–83° C. was obtained.

EXAMPLE X 55.5 g. of acrylonitrile was added drop by drop, while stirring and cooling with a mixture of ice and sodium chloride, to a mixture of 50 g. of hydrazine hydrate of 100% strength and 50 milliliters of methanol. The reaction temperature should not exceed 5° C. After removal of the cooling bath, the mixture was stirred for 10 minutes and then 96 g. of freshly distilled furfural added drop by drop in such a manner that the reaction temperature did not exceed 40° C. The mixture was then stirred for 15 minutes and the methanol and water formed during the reaction were evaporated under reduced pressure. To the resulting anhydrous furfurylidene-β-cyano-ethyl hydrazone was added a solution of 2.3 g. of sodium in 400 milliliters of anhydrous n-propanol and the whole was heated for five hours with refluxing. The propanol was then evaporated under a pressure of 10–15 mm. Hg and the crude 1-furfuryl-5-aminopyrazole was distilled by means of an oil pump. Boiling point: 122–124° C.$^{0.5}$ $^{mm.}$ $^{Hg}$. Melting point: 69–70° C. Yield: 132–137 g.=81–84% of theoretical.

When 2-ethylhexanol-(1) was used instead of a propanol, a yield of 75–77% of theoretical was obtained.

EXAMPLE XI

A solution of 35.2 g. of p-chlorobenzaldehyde in 60 milliliters of methanol was added drop by drop, while stirring, to 24.8 g. of β-cyano-α-methylethyl hydrazine. The rate of drop-by-drop addition was adjusted so that the reaction temperature was maintained between 35 and 40° C. The mixture was then stirred for 15 minutes and the methanol and the water liberated by the reaction were evaporated in a water-jet vacuum. 100 milliliters of isobutyl alcohol, containing 0.6 g. of potassium in solution, was added to the hydrazone, which was obtained in the form of a light yellow oil, and the whole mass was heated for five hours with refluxing. After it had cooled, the reaction solution was extracted by shaking with 50 milliliters of aqueous ammonium chloride (2% strength). The aqueous phase was separated off and discarded. The isobutanol was evaporated at a pressure of about 15 mm. Hg and the crystallized crude product distilled under reduced pressure. Boiling point: 153–154° C.$^{0.4}$ $^{mm.}$ $^{Hg}$. Melting point: 95–96° C. 41 to 43 g. of 1-(p-chlorobenzyl)-3-methyl-5-aminopyrazole, corresponding to a yield of 74–78% of theoretical, was obtained.

EXAMPLE XII 99 g. of acetaldehyde monoethyl acetal were added drop-wise and with the stirring to a mixture of 85 g. of β-cyano-ethyl hydrazine and 50 milliliters of ethanol in such a manner that a reaction temperature of 40° C. was not exceeded. Next, the mixture was stirred for ten minutes and then the ethanol and the water liberated by the reaction were evaporated in a water-jet vacuum. A solution of 2.3 g. of sodium in 400 milliliters of butanol was added to the oily acetaldehyde-β-cyano-ethyl hydrazone remaining and the mass was heated for two hours with refluxing. When the reaction was complete, the butanol was evaporated at a pressure of 15 mm. Hg and the 1-ethyl-5-aminopyrazole obtained as a reaction product was distilled by means of an oil pump. Boiling point: 75–76° C. $^{0.25}$ $^{mm.}$ $^{Hg}$. Melting point: 59–60° C. The yield was 78.5 to 80 g.=71–72% of theoretical.

Similar results are obtained when the method of the examples described above is modified so that instead of sodium alcoholate the corresponding potassium alcoholate is used and/or instead of n-butanol other alcohols, for example isobutanol, n-propanol, glycol or propylene gylcol or mixtures of various alcoholates. Generally, the alcohol employed to form the alcoholate is used in excess so that it forms the reaction medium at the same time. When low-boiling alcohols are used, the reaction time must be increased accordingly. But in these cases also, the use of pressure enables the preferred temperature range of 90–130° C. for the ring-closure reaction to be maintained. In certain cases, for example when alcoholates of higher-boiling alcohols are used, it is advantageous to use additional inert diluents or solvents. In many cases the hydrazone to be used can itself also serve as a solvent. It is advantageous to select as a solvent liquids whose boiling points permit the regulation of the desired reaction temperature. The process can be readily adapted to the various starting materials by the modifications with which the expert is familiar.

The structural formulae of a number of representative compounds, the preparation of which has proved to be particularly favorable, are listed in the following table which details additional examples following the methods of Examples I–III. The melting and boiling points are given for the products as prepared in a pure form. The representaive compounds, listed in the "End Product" column of the table, correspond to the general Formula II given above and the significance of the radicals $R_1$, $R_2$, $R_3$ and $R_4$ is stated in the respective column of the table for each case.

The compounds shown in the table were obtained by the method of production according to the invention in good yields of between 70% and 95% of the theoretical, relative to the hydrazone or ketazone used.

TABLE

| Example No. | Initial Reactants — Hydrazine Hydrate and Nitrile and Aldehyde or Ketone (Carbonyl Compound) | | End Product (Formula II) | | | | Melting Point, °C. | Boiling Point, °C./mm. Hg |
|---|---|---|---|---|---|---|---|---|
| | | | $R_1$ | $R_2$ | $R_3$ | $R_4$ | | |
| 1 | $CH_2=CH-CN$ | $HCHO$ | $H$ | $H$ | $H$ | $H$ | 75–76 | 87–91/0.4 |
| 2 | $CH_2=CH-CN$ | $CH_3-CHO$ | $CH_3-$ | $H$ | $H$ | $H$ | 59–60 | 75/0.25 |
| 3 | $CH_2=CH-CN$ | $CH_3-CH_2-CHO$ | $CH_3-CH_2-$ | $H$ | $H$ | $H$ | | 73/0.1 |
| 4 | $CH_2=CH-CN$ | $CH_3-C(=O)-CH_3$ | $CH_3-$ | $CH_3-$ | $H$ | $H$ | 60–61 | 68–70/0.2 |
| 5 | $CH_2=CH-CN$ | $CH_3-CH_2-CH_2-CHO$ | $CH_3-CH_2-CH_2-$ | $H$ | $H$ | $H$ | | 80–81/0.2 |
| 6 | $CH_2=CH-CN$ | $(CH_3)_2CH-CHO$ | $(CH_3)_2CH-$ | $H$ | $H$ | $H$ | | 81–84/0.4 |
| 7 | $CH_2=CH-CN$ | $CH_3-C(=O)-CH_2-CH_3$ | $CH_3-$ | $CH_3-CH_2-$ | $H$ | $H$ | 78–80/0.3 | |
| 8 | $CH_2=CH-CN$ | $CH_3-CH_2-CH_2-CH_2-CHO$ | $CH_3-CH_2-CH_2-CH_2-$ | $H$ | $H$ | $H$ | | 103–104/0.3 |
| 9 | $CH_2=CH-CN$ | $(CH_3)_2CH-CH_2-CHO$ | $(CH_3)_2CH-CH_2-$ | $H$ | $H$ | $H$ | 28–29 | 102/0.6 |
| 10 | $CH_2=CH-CN$ | $CH_3-O-CH_2-CHO$ | $CH_3-O-CH_2-$ | $H$ | $H$ | $H$ | | 92/0.1 |
| 11 | $CH_2=CH-CN$ | $CH_3-C(=O)-C_6H_5$ | $CH_3-$ | $C_6H_5-$ | $H$ | $H$ | 123–124 | 130–131/0.6 |
| 12 | $CH_2=CH-CN$ | $C_6H_5-CHO$ | $C_6H_5-$ | $H$ | $H$ | $H$ | 80–81 | 133–135/0.3 |
| 13 | $CH_2=CH-CN$ | $C_6H_5-CH_2-CHO$ | $C_6H_5-CH_2-$ | $H$ | $H$ | $H$ | | 133–135/0.2 |
| 14 | $CH_2=CH-CN$ | $C_6H_5-CH_2-CH_2-CHO$ | $C_6H_5-CH_2-CH_2-$ | $H$ | $H$ | $H$ | | 151/0.3 |
| 15 | $CH_2=CH-CN$ | cyclohexanone | $-CH_2-CH_2-CH_2-CH_2-CH_2-$ ($R_1, R_2$ ring) | | $H$ | $H$ | | 115–120/0.5 |
| 16 | $CH_2=CH-CH$ | cyclopentanone | $-CH_2-CH_2-CH_2-CH_2-$ ($R_1, R_2$ ring) | | $H$ | $H$ | | 99–100/0.2 |
| 17 | $CH_2=CH-CN$ | $(C_6H_5)_2CH-CHO$ | $(C_6H_5)_2CH-$ | $H$ | $H$ | $H$ | 108–104 | 174/0.3 |
| 18 | $CH_2=CH-CN$ | $C_6H_5-CH(CH_3)-CHO$ | $C_6H_5-CH(CH_3)-$ | $H$ | $H$ | $H$ | | 121–123/0.15 |
| 19 | $CH_2=CH-CN$ | cyclohexyl-CHO | cyclohexyl- | $H$ | $H$ | $H$ | 56–57 | 105–106/0.15 |
| 20 | $CH_2=CH-CN$ | $4\text{-}Cl\text{-}C_6H_4-CHO$ | $4\text{-}Cl\text{-}C_6H_4-$ | $H$ | $H$ | $H$ | 75–76 | 141–142/0.12 |
| 21 | $CH_2=CH-CN$ | $4\text{-}(CH_3)_2N\text{-}C_6H_4-CHO$ | $4\text{-}(CH_3)_2N\text{-}C_6H_4-$ | $H$ | $H$ | $H$ | 86–87 | 173/0.15 |

TABLE

| Example No. | Initial Reactants - Hydrazine Hydrate and Nitrile | Initial Reactants - Aldehyde or Ketone (Carbonyl Compound) | End Product (Formula II) $R_1$ | $R_2$ | $R_3$ | $R_4$ | Melting Point, °C. | Boiling Point, °C./mm. Hg |
|---|---|---|---|---|---|---|---|---|
| 22 | $CH_2=CH-CN$ | 2-Cl-C₆H₄-CHO | 2-Cl-C₆H₄- | H | H | H | 71-82 | 131-132/0.15 |
| 23 | $CH_2=CH-CN$ | 4-OCH₂O-C₆H₃-CHO | 3,4-OCH₂O-C₆H₃- | H | H | H | 82-83 | 168-171/0.2 |
| 24 | $CH_2=CH-CN$ | 4-(CH₃)₂CH-C₆H₄-CHO | 4-(CH₃)₂CH-C₆H₄- | H | H | H | 95-96 | 152/0.25 |
| 25 | $CH_2=CH-CN$ | 1-CH₃-4-piperidone | $-CH_2-CH_2-N(CH_3)-CH_2-CH_2-$ ($R_1,R_2$ ring) | | H | H | 129-130 | 131-133/0.2 |
| 26 | $CH_2=CH-CN$ | 2-furyl-CHO | 2-furyl- | H | H | H | 69-70 | 111/0.1 |
| 27 | $CH_2=CH-CN$ | 2-thienyl-CHO | 2-thienyl- | H | H | H | 72-73 | 130/0.2 |
| 28 | $CH_2=CH-CN$ | 3,4-(-CH₂-CH₂-)-C₆H₃-CHO | indanyl | H | H | H | --- | 158-159/0.16 |
| 29 | $CH_2=CH-CN$ | pyridyl-CHO | pyridyl | H | H | H | 139-140 | 165/0.2 |
| 30 | $CH_3-CH_2-CH_2-CN$ | HCHO | H | H | CH₃- | H | 79-80 | 100-106/0.4 |
| 31 | $CH_3-CH_2-CH_2-CN$ | CH₃-CHO | CH₃- | H | CH₃- | H | 100-101 | 80-90/0.3 |
| 32 | $CH_3-CH_2-CH_2-CN$ | CH₃-CH₂-CHO | CH₃-CH₂- | H | CH₃- | H | --- | 98-101/0.4 |
| 33 | $CH_3-CH_2-CH_2-CN$ | CH₃-CH₂-CH₂-CHO | CH₃-CH₂-CH₂- | H | CH₃- | H | 91-92 | 90-95/0.05 |
| 34 | $CH_3-CH_2-CH_2-CN$ | (CH₃)₂CH-CHO | (CH₃)₂CH- | H | CH₃- | H | 59-60 | 122-125/0.7 |
| 35 | $CH_3-CH_2-CH_2-CN$ | (CH₃)₂CH-CH₂-CHO | (CH₃)₂CH-CH₂- | H | CH₃- | H | 80-81 | 107-110/0.2 |
| 36 | $CH_3-CH_2-CH_2-CN$ | C₆H₅-CHO | C₆H₅- | H | CH₃- | H | --- | --- |
| 37 | $CH_3-CH_2-CH_2-CN$ | C₆H₅-CHO | C₆H₅- | H | CH₃- | H | 72-73 | 130-131/0.2 |
| 38 | $CH_3-CH_2-CH_2-CN$ | 2-Cl-C₆H₄-CHO | 2-Cl-C₆H₄- | H | CH₃- | H | 101-102 | 165-168/0.8 |
| 39 | $CH_2=CH-CH_2CN$ | 4-Cl-C₆H₄-CHO | 4-Cl-C₆H₄- | H | CH₃- | H | 95-96 | 163-154/0.4 |

TABLE

| Example No. | Initial Reactants | | End Product (Formula II) | | | | Melting Point, °C. | Boiling Point, °C./mm. Hg |
|---|---|---|---|---|---|---|---|---|
| | Hydrazine Hydrate and Nitrile and Aldehyde or Ketone (Carbonyl Compound) | | $R_1$ | $R_2$ | $R_3$ | $R_4$ | | |
| 40 | $CH_2=CH-CH_2CN$ | $CH_3-C(=O)-C_6H_5$ | $CH_3-$ | phenyl | $CH_3-$ | H | -------- | 130/0.5 |
| 41 | $CH_2=CH-CH_2CN$ | furyl-CHO | furyl | H | $CH_3-$ | H | -------- | 124/0.6 |
| 42 | $CH_2=CH-CH_2CN$ | thienyl-CHO | thienyl | H | $CH_3-$ | H | 99-100 | 131-133/0.2 |
| 43 | $CH_2=CH-CH_2CN$ | $CH_3-N$(piperidone) | $-CH_2-CH_2-N(CH_3)-CH_2-CH_2-$ ($R_1$, $R_3$ ring) | | | H | 99-100 | 141-142/0.4 |
| 44 | $CH_2=CH-CH_2CN$ | pyridyl-CHO | pyridyl | H | $CH_3-$ | H | 92-93 | -------- |
| 45 | $CH_2=CH-CH_2CN$ | N-methylpyrrolyl-CHO | N-methylpyrrolyl | H | $CH_3-$ | H | 103-104 | 107-108/0.1 |
| 46 | $CH_3-CH=CH-CH=CH-CN$ | HCHO | H | H | $CH_3-CH_2-$ | H | 74-75 | -------- |
| 47 | $CH_3-CH=CH-CH=CH-CN$ | $CH_3-CHO$ | $CH_3-$ | H | $CH_3-CH_2-$ | H | 66-67 | 92/0.1 |
| 48 | $CH_3-CH(CH_3)-C(CH_3)H-CH=CH-CN$ | HCHO | H | H | $(CH_3)_2CH-$ | H | 111-112 | -------- |
| 49 | $C_6H_5-CH=CH-CN$ | $CH_3-CH_2-CHO$ | $CH_3-CH_2-$ | H | phenyl | H | 106-107 | 167/0.75 |
| 50 | $C_6H_5-CH=CH-CN$ | $C_6H_5-CHO$ | phenyl | H | phenyl | H | 125-126 | 232-235/0.6 |
| 51 | furyl-CH=CH-CN | $C_6H_5-CHO$ | phenyl | H | furyl | H | 144-145 | 225-226/2.0 |
| 52 | furyl-CH=CH-CN | $CH_3-CHO$ | $CH_3-$ | H | furyl | H | 104-105 | 165-167/0.8 |
| 53 | thienyl-CH=CH-CN | furyl-CHO | furyl | H | thienyl | H | 117-118 | 188-185/0.2 |
| 54 | $CH_2=C(CH_3)-CN$ | HCHO | H | H | H | $CH_3-$ | 135-136 | 77/1.3 |
| 55 | $CH_2=C(CH_3)-CN$ | $CH_3CHO$ | $CH_3-$ | H | H | $CH_3-$ | -------- | 74-76/0.1 |
| 56 | $CH_2=C(CH_3)-CN$ | $CH_3-CH_2-CHO$ | $CH_3-CH_2-$ | H | H | $CH_3-$ | -------- | 87-88/0.3 |

TABLE

| Example No. | Initial Reactants: Hydrazine Hydrate and Nitrile | Initial Reactants: Aldehyde or Ketone (Carbonyl Compound) | End Product (Formula II): $R_1$ | $R_2$ | $R_3$ | $R_4$ | Melting Point, °C. | Boiling Point, °C./mm. Hg |
|---|---|---|---|---|---|---|---|---|
| 57 | $CH_2=C(CH_3)-CN$ | $CH_3-C(=O)-CH_3$ | $CH_3-$ | $CH_3-$ | H | $CH_3-$ | ------ | 71–75/0.3 |
| 58 | $CH_2=C(CH_3)-CN$ | $CH_3-CH_2-CH_2-CHO$ | $CH_3-CH_2-CH_2-$ | H | H | $CH_3-$ | ------ | 97–98/0.4 |
| 59 | $CH_2=C(CH_3)-CN$ | $(CH_3)_2CH-CHO$ | $(CH_3)_2CH-$ | H | H | $CH_3-$ | ------ | 77–79/0.05 |
| 60 | $CH_2=C(CH_3)-CN$ | Ph-CHO | Ph- | H | H | $CH_3-$ | 129–130 | ------ |
| 61 | $CH_2=C(CH_3)-CN$ | furan-2-CHO | furan-2-yl | H | H | $CH_3-$ | 87–88 | 146–147/1.7 |
| 62 | $CH_2=C(CH_3)-CN$ | pyridin-4-CHO | pyridin-4-yl | H | H | $CH_3-$ | 129–130 | 161–163/0.2 |
| 63 | thiophene-2-C(CN)=CH-CH_3 | 1-methyl-piperidin-4-one | $-CH_2-CH_2-N(CH_3)-CH_2-CH_2-$ ($R_1, R_2$ ring) | | H | thiophen-2-yl | 98–99 | ------ |
| 64 | thiophene-2-C(CN)=CH-CH_2-CH_3 | 1-methyl-piperidin-4-one | $-CH_2-CH_2-N(CH_3)-CH_2-CH_2-$ ($R_1, R_2$ ring) | | $CH_3-CH_2-$ | thiophen-2-yl | 130–131 | ------ |
| 65 | Ph-CH(CN)-CH-CH_3 | 1-methyl-piperidin-4-one | $-CH_2-CH_2-N(CH_3)-CH_2-CH_2-$ ($R_1, R_2$ ring) | | $CH_3-$ | Ph- | 141–143 | ------ |
| 66 | $CH_2=C(CH_3)-CN$ | 3,4-methylenedioxy-benzaldehyde | 3,4-methylenedioxyphenyl | H | H | $CH_3-$ | 119–120 | 179–182/1.2 |
| 67 | $CH_2=CH-CN$ | 4-methoxy-benzaldehyde | 4-methoxyphenyl | H | H | H | ------ | 147/0.2 |
| 68 | $CH_2=CH-CN$ | 2-methoxy-benzaldehyde | 2-methoxyphenyl | H | H | H | ------ | ------ |
| 69 | $CH_2=CH-CN$ | fluorenone | fluorenyl | H | H | H | 132–133 | ------ |
| 70 | $CH_2=CH-CH_2-CN$ | $CH_3-O-CH_2-CH_2-CHO$ | $CH_3-O-CH_2-CH_2-$ | H | $CH_3-$ | H | 72–73 | 100–111/0.4 |

I claim:
1. A process for producing a substituted 5-aminopyrazole of the formula

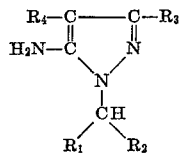

comprising the step of cyclizing a compound selected from the group consisting of aldehyde and ketone hydrazone derivatives of β-cyano-alkyl hydrazines and having substantially the structural formula

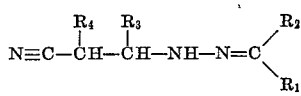

wherein $R_1$ is a hydrogen, an alkyl group of 1 to 5 carbon atoms, cyclopentyl, cyclohexyl, phenyl, benzyl, phenylethyl, isopropylphenyl, diphenylmethyl, furfuryl, pyridine, thiophene, dimethylaniline, methoxyethyl, methoxyphenyl, chlorophenyl,

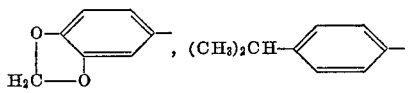

or

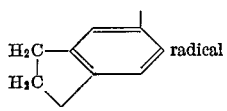 radical $R_2$ is a hydrogen, methyl, ethyl or phenyl radical or $R_1$ and $R_2$, is

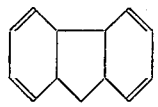

forming a common ring between $R_1$ and $R_2$,

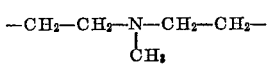

forming a common ring between $R_1$ and $R_2$; and $R_3$ is a hydrogen, methyl, ethyl, proyl, phenyl, furyl or thenyl radical, and $R_4$ is a hydrogen, methyl, thenyl or phenyl radical.

2. The process defined in claim 1 wherein said compound is cyclized by heating said compound in a liquid solvent in the presence of an alcoholate isomerization catalyst to a temperature and for a period sufficient to convert said compound to the corresponding 5-aminopyrazole.

3. A process as defined in claim 2 wherein said alcoholate is an alkali-metal butylate.

4. A process as defined in claim 2 wherein said solvent is an alcohol corresponding to that of said alcoholate and is present in a quantity in excess over that comprised in said alcoholate.

5. A process as defined in claim 4 wherein said temperature ranges between substantially 90 and 130° C.

6. A process as defined in claim 2, further comprising the step of forming said compound prior to cyclization and without isolation thereof by reacting a substance selected from the group which consists of an aldehyde, ketone and derivatives thereof with a substituted β-cyanoalkyl hydrazine having substantially the formula

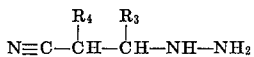

7. A process as defined in claim 2, further comprising the step of forming said compound prior to its cyclization and without isolation thereof by reacting simultaneously:
(a) a first component selected from the group which consists of hydrazine and hydrazine hydrate;
(b) a second component selected from the group which consists of an aldehyde, a ketone, and derivatives thereof; and
(c) a third component selected from the group which consists of α,β-unsaturated alkenic acid nitriles having substantially the formula

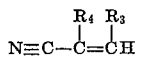

and β,γ-unsaturated alkenic acid nitriles having substantially the formula

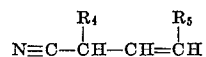

wherein $R_5$ is methane or a radical as listed for $R_3$ omitting hydrogen.

References Cited

UNITED STATES PATENTS

| | | | |
|---|---|---|---|
| 3,041,342 | 6/1962 | Jucker et al. | 260—310 |
| 3,228,947 | 1/1966 | Schmidt et al. | 260—310 |

FOREIGN PATENTS 863,060    3/1961    Great Britain.

OTHER REFERENCES

American Cyanamid—The Chemistry of Acrylonitrile, 2nd ed., pages 22–24, New York, American Cyanamid, 1959.

Chem. Abst., vol. 59, column 3931 (1963), (abstract of Belgian Patent 618,321).

Chem. Abst., vol. 59, column 5174 (1963), (abstract of Belgian Patent 618,322).

Grandberg et al., Zh. Obshch. Khim., vol. 31, pages 2307–10 (1961).

Grandberg et al., Zh. Obshch. Khim., vol. 31, pages 2311–15 (1961).

Grandberg et al., Zh. Obshch. Khim., vol. 32, page 1902 relied on (1962).

Migradichian Organic Synthesis, vol. 1, pages 151–5, New York, Reinhold, 1957.

JOHN D. RANDOLPH, *Primary Examiner.*

NATALIE TROUSOF, *Assistant Examiner.*